United States Patent
Blanchard et al.

(10) Patent No.: US 11,491,839 B2
(45) Date of Patent: Nov. 8, 2022

(54) SUSPENSION THRUST BEARING DEVICE AND SUSPENSION STRUT EQUIPED WITH SUCH A DEVICE

(71) Applicant: Aktiebolaget SKF, Gothenburg (SE)

(72) Inventors: Xavier Blanchard, Saint-Cyr-sur-Loire (FR); Guillaume Jouanno, Tours (FR); Bruno Montboeuf, Saint-Cyr-sur-Loire (FR); Desire Vidot, Ballan-Miré (FR)

(73) Assignee: Aktiebolaget SKF, Gothenburg (SE)

(*) Notice: Subject to any disclaimer, the term of this patent is extended or adjusted under 35 U.S.C. 154(b) by 279 days.

(21) Appl. No.: 16/745,449

(22) Filed: Jan. 17, 2020

(65) Prior Publication Data
US 2020/0238779 A1 Jul. 30, 2020

(30) Foreign Application Priority Data
Jan. 29, 2019 (DE) .......................... 102019201119.5

(51) Int. Cl.
*B60G 15/06* (2006.01)
*F16C 19/10* (2006.01)

(52) U.S. Cl.
CPC ............ *B60G 15/068* (2013.01); *F16C 19/10* (2013.01); *B60G 2204/124* (2013.01); *B60G 2204/418* (2013.01); *F16C 2326/05* (2013.01)

(58) Field of Classification Search
CPC ............ B60G 15/068; B60G 2204/124; B60G 2204/418; B60G 2204/1242; B60G 2206/013; B60G 15/067; F16C 19/10; F16C 2326/05
See application file for complete search history.

(56) References Cited

U.S. PATENT DOCUMENTS

| | | | |
|---|---|---|---|
| 6,736,381 B2 | 5/2004 | Chesne | |
| 9,381,784 B2* | 7/2016 | Stautner | F16C 17/04 |
| 2004/0245691 A1* | 12/2004 | Handke | B60G 15/068 |
| | | | 267/292 |
| 2010/0014792 A1 | 1/2010 | Kellam | |
| 2011/0101584 A1* | 5/2011 | Viault | F16C 35/042 |
| | | | 267/221 |

(Continued)

FOREIGN PATENT DOCUMENTS

| | | | | |
|---|---|---|---|---|
| DE | 102007024628 A1 * | 12/2007 | | F16C 35/042 |
| DE | 102016215757 A1 * | 3/2018 | | B60G 15/067 |

(Continued)

OTHER PUBLICATIONS

Machine translation of KR20170017618 (Year: 2017).*

*Primary Examiner* — James A English
*Assistant Examiner* — Kurtis Nielson
(74) *Attorney, Agent, or Firm* — Garcia-Zamor Intellectual Property Law; Ruy Garcia-Zamor; Bryan Peckjian

(57) ABSTRACT

A suspension thrust bearing device for use with a suspension spring in an automotive suspension strut of a vehicle. The device includes an upper annular bearing member and a lower annular bearing member in relative rotation. The lower annular bearing member having a body provided with an embedded stiffening insert. The device further provides a damping element made of resilient material and interposed between the lower annular bearing member and the suspension spring. A radial flange of the damping element prevents separation from the lower side of the radial flange of the lower cap.

18 Claims, 2 Drawing Sheets

(56) References Cited

U.S. PATENT DOCUMENTS

| | | | |
|---|---|---|---|
| 2011/0221158 A1* | 9/2011 | Stautner | B60G 15/068 |
| | | | 280/124.147 |
| 2012/0146306 A1 | 6/2012 | Dubus et al. | |
| 2012/0257849 A1* | 10/2012 | Corbett | F16C 33/60 |
| | | | 384/607 |
| 2012/0292841 A1* | 11/2012 | Corbett | B60G 15/068 |
| | | | 267/217 |
| 2014/0023308 A1* | 1/2014 | Stautner | F16C 33/581 |
| | | | 384/615 |
| 2015/0367698 A1* | 12/2015 | Stautner | F16C 17/04 |
| | | | 384/144 |
| 2017/0261032 A1 | 9/2017 | Lepine et al. | |
| 2018/0236837 A1* | 8/2018 | Lutz | B60G 15/068 |
| 2018/0372152 A1 | 12/2018 | Gaultier et al. | |
| 2021/0107327 A1* | 4/2021 | Blanchard | B60G 15/062 |
| 2022/0080798 A1* | 3/2022 | Song | B29C 65/606 |

FOREIGN PATENT DOCUMENTS

| | | | | |
|---|---|---|---|---|
| EP | 0215231 A2 | | 3/1987 | |
| EP | 2152531 A2 | | 2/2010 | |
| FR | 2949525 A1 | * | 3/2011 | ............ F16C 33/588 |
| KR | 20170017618 A | * | 2/2017 | |
| KR | 20170025879 A | * | 3/2017 | |
| KR | 20170086371 A | * | 7/2017 | |
| KR | 20200033219 A | * | 3/2020 | |
| KR | 20200068974 A | * | 6/2020 | ............. B60G 13/08 |
| WO | WO-2008152241 A2 | * | 12/2008 | ........... B60G 15/068 |
| WO | WO-2018046038 A1 | * | 3/2018 | ............ F16C 33/106 |

\* cited by examiner

SUSPENSION THRUST BEARING DEVICE AND SUSPENSION STRUT EQUIPED WITH SUCH A DEVICE

CROSS-REFERENCE TO RELATED APPLICATIONS

This application claims priority to German Patent Application no. 102019201119.5, filed Jan. 29, 2019, the contents of which are fully incorporated herein by reference.

TECHNICAL FIELD OF THE INVENTION

The present invention relates to a suspension thrust bearing device, in particular of the MacPherson type ("MacPherson Suspension Bearing Unit" or MSBU). The invention also relates to a strut for a motor vehicle, comprising a damper and such a suspension thrust bearing device. The field of the invention is that of suspension systems, notably motor-vehicle suspension systems.

BACKGROUND OF THE INVENTION

In a known manner, a motor vehicle suspension system comprises a suspension strut supporting an axle and a vehicle wheel. A suspension thrust bearing device is disposed in an upper portion of the suspension strut, opposite to the wheel and the ground, and between a suspension spring and an upper support block attached to the vehicle chassis.

The suspension thrust bearing device includes at least one bearing, for example a rolling bearing, comprising upper and lower annular bearing members in relative rotation around a main axis.

The suspension thrust bearing device enables transmission of axial forces between the spring and the body of the vehicle and, in the meantime, allows relative angular movement between the spring, which is mobile in rotation, and the fixed support block attached to the body.

The damping function of the suspension thrust bearing device can be improved using a damping element made of resilient material and mounted between the lower annular bearing member and the suspension spring. In a known manner, the damping element is overmolded onto the lower member.

However, the axial load and vibrations of suspension spring onto the damping element may induce axial and radial deformations of the element. Relative micro displacements may be induced between the damping element and the lower bearing element. This undesired damping element displacement leads to separation of damping element from the lower bearing element. The consequences are negative impact on damping performances. The suspension strut may have a reduced service life. It also leads to an extra noise which must be prohibited.

SUMMARY OF THE INVENTION

The aim of the invention is to overcome these drawbacks by proposing an enhanced suspension thrust bearing device. It is desirable to provide a suspension thrust bearing device which is relatively inexpensive, has a good operational reliability, and has an increased service life.

To this end, the invention relates to a suspension thrust bearing device, for use with a suspension spring in an automotive suspension strut of a vehicle. The suspension thrust bearing device comprises a bearing having upper and lower annular bearing members in relative rotation. The lower annular bearing member has a body provided with an embedded stiffening insert.

The suspension thrust bearing device further comprises a damping element made of resilient material and interposed between the lower annular bearing member and the suspension spring.

According to the invention, the body of annular bearing member comprises at least one body through hole, and the embedded stiffening insert also comprises at least one insert through hole provided within the body through hole. The insert through hole is of lower diameter than the body through hole. The damping element further comprises at least one extending pin arranged within the body and insert through holes, the pin having a circumferential groove wherein the insert is fitted.

According to further aspects of the invention which are advantageous but not compulsory, such a suspension thrust bearing device may incorporate one or several of the following features:

The suspension thrust bearing device comprises a bearing with a first ring fixed to an upper cap, so as to form the upper annular bearing member of the suspension thrust bearing, and a second ring fixed to a lower cap, so as to form the lower annular bearing member of the suspension thrust bearing.

The first and second rings are made from a stamped metal sheet.

The upper and lower caps are made from a rigid plastic material.

The bearing is a rolling bearing, the first and second rings defining an annular rolling chamber between them and at least one row of rolling elements being disposed within the rolling chamber.

The rolling elements are balls.

The damping element is directly molded on the lower annular bearing member.

The damping element comprises rubber thermoplastic elastomer (TPE), in particular thermoplastic polyurethane (TPU), melt processible elastomer (MPE) or elastomer cellular foam.

The lower bearing member and the embedded stiffening insert comprise each a plurality of circumferentially arranged through holes.

The body and insert through holes are equally circumferentially spaced.

The lower cap comprises a radial flange, a stiffening insert being embedded within the radial flange.

The lower cap comprises an axial hub, a stiffening insert being embedded within the axial hub.

The radial flange and the embedded stiffening insert comprise each at least one of the through hole.

The axial hub and the embedded stiffening insert comprise each at least one of the through hole.

The invention also relates to a motor vehicle suspension strut comprising a damper rod, a suspension spring, and a suspension thrust bearing device as mentioned above.

BRIEF DESCRIPTION OF THE DRAWINGS

The invention will now be explained in correspondence with the annexed figures, as an illustrative example, without restricting the object of the invention. In the annexed figures.

DETAILED DESCRIPTION OF SOME EMBODIMENTS

Figure 1:
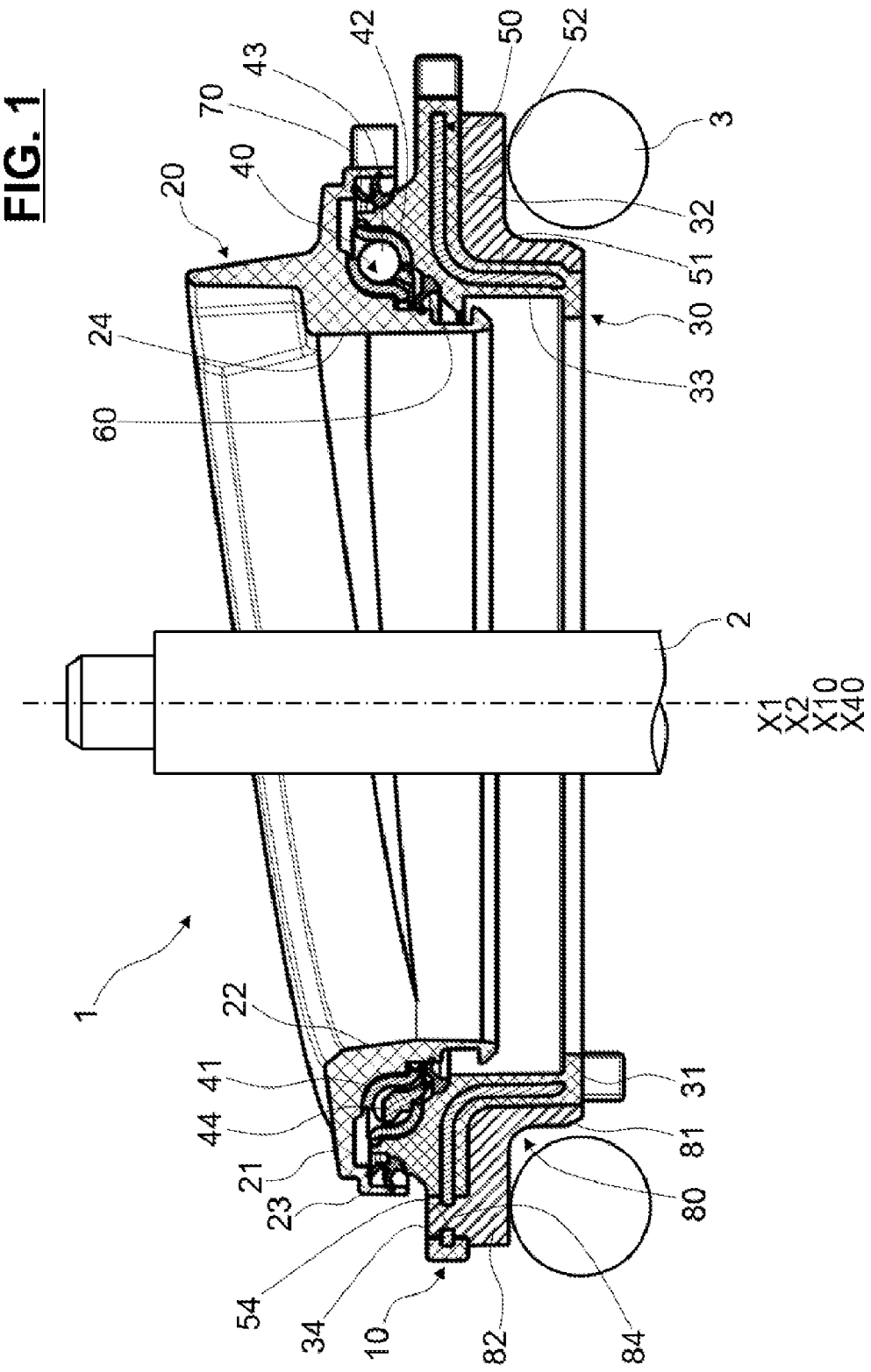
FIG. 1 is a sectional view of a suspension strut according to a first embodiment of the invention, comprising a suspension thrust bearing unit also according to a first embodiment of the invention, and a damper rod and a suspension spring.

A suspension strut 1, partially shown in FIG. 1, is incorporated into a motor-vehicle suspension system. The suspension strut 1 supports a vehicle axle and wheel which are not shown for the purposes of simplification. The suspension strut 1 extends along a main axis X1, placed in substantially vertical direction when the wheel of the vehicle rests on flat ground. The suspension strut 1 comprises a damper piston including a piston body and a damper rod 2 of axis X2, a coil suspension spring 3 and a suspension thrust bearing device 10. The rod 2 and the spring 3 are partially shown in FIG. 1, while the piston body is not shown for the purposes of simplification.

The suspension thrust bearing device 10 with main axis X10 is mounted between the spring 3 and a support block (not shown) connected to the chassis of a motor vehicle. The axis X2 and X10 coincide with the main axis X1 when the suspension system of the vehicle is at rest, as illustrated in FIG. 1.

Hereinafter, the adjectives "axial" and "radial" are defined relative to the main axis X10 of the annular thrust bearing device 10.

The suspension thrust bearing device 10 comprises an upper cap 20, a lower cap 30 and a single rolling bearing 40. In this embodiment, these three components 20, 30 and 40 are of globally circular shape about a main axis X40 coinciding with the main axis X10 when the suspension system of the vehicle is at rest.

The upper cap 20 consists in a one-piece part made from plastic synthetic material, for example from polyamide, optionally reinforced with glass fibers. The upper cap 20 has a radially-extending flange 21, an inner axially-extending hub 22 of relatively small diameter and extending towards the lower side of the suspension thrust bearing device 10, and an outer axially-extending skirt 23 of relatively large diameter and extending towards the lower side of the suspension thrust bearing device 10. The inner hub 22 defines an inner bore 24 for the suspension thrust bearing device 10 wherein the damper rod 2 is mounted.

The upper cap 20 is dedicated to be fixed to a support block of the automotive vehicle chassis.

The rolling bearing 40 comprises a pressed sheet metal inner race 41, an outer race 42 also of pressed sheet metal, a row of rolling elements 43, here balls, and a cage 44 for maintaining a regular circumferential spacing between the rolling elements 43. The rolling elements 43 are disposed in a rolling chamber defined between raceways formed by toroidal portions of the inner race 41 and outer race 42.

As an alternative not shown, no rolling elements need to be used but rather the inner and outer races may directly contact each other, with a suitable low friction material, coating, or lubricant being used.

The rolling bearing 40 is integrally radially located between the inner hub 22 and the outer skirt 23 of the upper cap 20. The inner race 41 is fitted within a toroidal inner portion of the lower cap 30. The inner race 41 and the lower cap 30 form a lower annular bearing member. The outer race 42 is fitted onto a toroidal outer portion provided on the lower side of flange 21 of the upper cap 20. The outer race 42 and the upper cap 20 form an upper annular bearing member. The upper and lower annular bearing members are in relative rotation with respect to the axis X40.

The lower cap 30 comprises an axially-extending hub 31 defining an inner bore 33 wherein the rod 2 axially extends. The lower cap 30 further comprises a radial flange 32 that radially outwardly extends 4 from the hub 31. The toroidal outer portion supporting the inner race 41 of the rolling bearing 40 is provided on an upper surface of the radial flange 32.

The lower cap 30 comprises a stiffening insert 34 extending along the hub 31 and the flange 32 so as to support the load and the shocks exerted by the spring 3.

As illustrated in FIG. 1, the lower cap 30 is further provided with a stiffening insert 50. The stiffening insert 50 may be in metal or in a rigid plastic. The stiffening insert 50 comprises an axially-extending hub 51 embedded within the hub 31 of lower cap 30. The stiffening insert 50 further comprises an outwardly radially-extending flange 52 connected to the hub 51, the insert flange 52 being embedded within the radial flange 32 of lower cap 30. Advantageously, the lower cap 30 is overmolded onto the stiffening insert 50. The hub 51 of stiffening insert 50 permits to support radial load and shocks exerted by the suspension spring 3 onto the hub 31 of lower cap 30, and the flange 52 of stiffening insert 50 permits to support axial load and shocks exerted by the suspension spring 3 onto the radial flange 32 of lower cap 30. The stiffening insert 50 permits to prevent any deformation of lower cap 30.

Inner sealing means 60 are provided between an inner periphery of the radial flange 32 of the lower cap 30 and the inner hub 22 of the upper cap 20. Outer sealing means 70 are provided between an outer periphery of the radial flange 32 of the lower cap 30 and the outer skirt 23 of the upper cap 20.

The lower cap 30 is further provided with a damping element 80 made from a resilient material so as to enable vibrations to be filtered.

The tubular axial portion 81 axially extends from the radial portion 82 towards the lower side of the suspension thrust bearing device 10. The tubular axial portion 81 is tightly fastened to an outer cylindrical surface of the hub 31 of the lower cap 30. The tubular axial portion 81 of the damping element 80 supports radial load and shocks from the suspension spring 2.

The damping element 80 comprises a tubular axial portion 81 and a radial portion 82. The radial portion 82 is tightly fastened to the lower side of the radial flange 32 of the lower cap 30. The radial portion 82 comprises a lower radial side for receiving an end turn of the suspension spring 3 in bearing contact. The radial portion 82 of the damping element 80 supports axial load and shocks from the suspension spring 3.

The tubular axial portion 81 and radial portion 82 of the damping element 80 are connected together so as to cover the exterior surface of the axial hub 31 and the radial flange 32 of the lower cap 30.

The damping element 80 is made from a resilient material, such as rubber thermoplastic elastomer (TPE), in particular thermoplastic polyurethane (TPU), melt processible elastomer (MPE) or elastomer cellular foam.

The damping element 80 is advantageously overmolded onto the lower cap 30.

Figure 2:
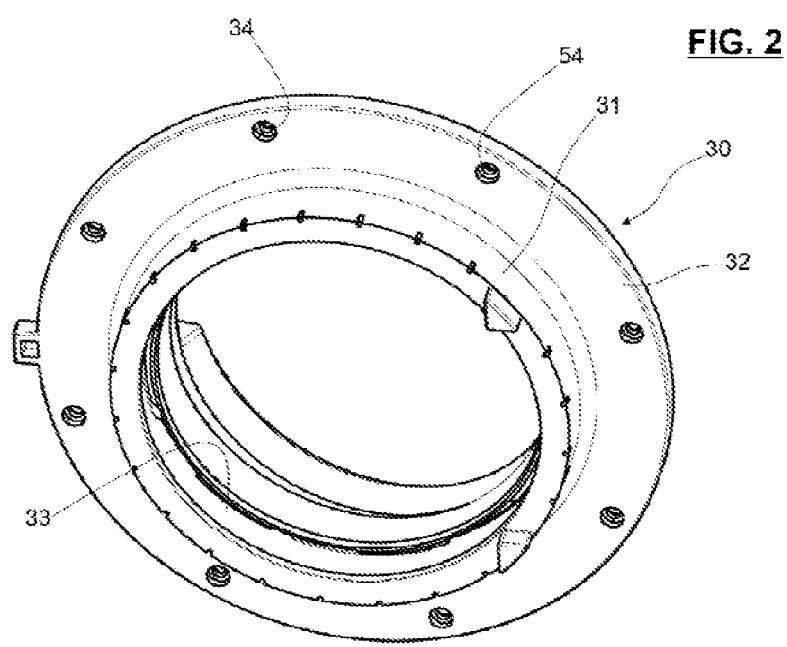
FIG. 2 is a perspective view of a lower cap body provided to the suspension strut of FIG. 1.

According to the invention, the radial flange 32 of lower cap 30 comprises a plurality of axial through holes 34. The through holes 34 extend radially through the thickness of radial flange 32 from lower side supporting the damping device 80 to upper side. In the illustrated embodiment of FIG. 2, radial through holes 34 are equally circumferentially spaced. Alternatively, radial through holes 34 may be unevenly spaced. In the illustrated embodiment of FIG. 2, the radial flange 32 comprises eight axial through holes 34. Alternatively, the radial flange 32 may comprise less or more axial through holes 34. In the illustrated embodiment of FIG. 2, the axial though holes 34 are cylindrical. Alternatively, the axial through holes may be of any other suitable shape.

The radial flange 52 of stiffening insert 50 also comprises a plurality of axial through holes 54. The radial flange 52 of stiffening insert 50 is embedded within the radial flange 32 of lower cap 30, and the insert axial through holes 54 are provided within the lower cap through holes 34. Insert axial through holes 54 are each of the same number, position and centre as lower cap axial through holes 34.

The insert through holes 54 are each of lower diameter than the diameter of cap through holes 34. Then the insert through hole 54 define a narrowing section in each of the cap through holes 34.

The radial flange 81 of damping element 80 further comprises a plurality of upwardly axially-extending pins 84. Pins 84 are each fitted into a corresponding axial through hole 34 of lower cap 30, and into a corresponding axial through hole 54 of insert 50. Pins 84 are each provided with a circumferential groove wherein the insert 50 is fitted. Since the insert through holes 54 are of reduced diameter with respect to the cap through holes 34, the pins 84 define upper and lower shoulders that axially block the insert 50. Advantageously, the pins 84 of damping element 80 are overmolded within the through holes 34, 54.

Thanks to the invention, the combination of pins 84 and axial through holes 34 and 54 forms axial mechanical retention means for the damping element 80 with the lower cap 30. More precisely, the radial flange 82 of damping element 80 is preventing for separating from the lower side of radial flange 32 of lower cap 30.

As an alternate embodiment not illustrated, the axial hub 31 of lower cap 30 and the axial hub 51 of stiffening insert 50 may comprises associated radial through holes. The damping element 80 has radial pins fitted within the holes and radially blocked by insert holes of reduced diameter with respect to cap holes.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provided improved cam follower roller device.

Moreover, various features of the above-described representative examples, as well as the various independent and dependant claims below, may be combined in ways that are not specifically and explicitly enumerated in order to provide additional useful embodiments of the present teachings.

The invention claimed is:

1. A suspension thrust bearing device for use with a suspension spring in an automotive suspension strut of a vehicle, the suspension thrust bearing device comprising:
a bearing having an upper annular bearing member and a lower annular bearing member in relative rotation, the lower annular bearing member having a body provided with an embedded stiffening insert, the embedded stiffening insert having a radially outermost end, and
a damping element made of resilient material and interposed between the lower annular bearing member and the suspension spring, wherein
the body of the lower annular bearing member comprises at least one body through hole, and the embedded stiffening insert also comprises at least one insert through hole provided within the body through hole, the insert through hole being smaller in diameter than the body through hole, and the damping element further comprises at least one extending pin arranged within the body and insert through holes, the pin having a circumferential groove wherein the insert is fitted, and wherein
all of the damping element which extends through the body through hole and the insert through hole has a smaller radially outermost diameter than an outer diameter of the radially outermost end of the stiffening element.

2. The device according to claim 1, wherein the damping element is directly molded onto the lower annular bearing member.

3. The device according to claim 1, wherein the lower annular bearing member and the embedded stiffening insert each comprise a plurality of corresponding circumferentially arranged through holes.

4. The device according claim 3, wherein the body and insert through holes are equally circumferentially spaced.

5. The device according to claim 1, further comprises the bearing with a first ring fixed to an upper cap, so as to form the upper annular bearing member of the suspension thrust bearing, and a second ring fixed to a lower cap, so as to form the lower annular bearing member of the suspension thrust bearing.

6. The device according to claim 5, wherein the lower cap comprises a radial flange, the stiffening insert being embedded within the radial flange.

7. The device according to claim 6, wherein the radial flange and the embedded stiffening insert each comprise at least one of the through holes.

8. The device according to claim 5, wherein the lower cap comprises an axial hub, and the stiffening insert being embedded within the axial hub.

9. The device according to claim 8, wherein the axial hub and the embedded stiffening insert each comprise at least one of the through holes.

10. A motor vehicle suspension strut comprising:
a damper rod,
a suspension spring, and
a suspension thrust bearing device providing a bearing having an upper annular bearing member and a lower annular bearing member in relative rotation, the lower annular bearing member having a body provided with an embedded stiffening insert, the embedded stiffening insert having a radially outermost end, and
a damping element made of resilient material and interposed between the lower annular bearing member and the suspension spring, wherein
the body of the lower annular bearing member comprises at least one body through hole, and the embedded stiffening insert also comprises at least one insert through hole provided within the body through hole, the insert through hole being smaller in diameter than the body through hole, and the damping element further comprises at least one extending pin arranged within the body and insert through holes, the pin having a circumferential groove wherein the insert is fitted, and wherein all of the damping element which extends through the body through hole and the insert through hole has a smaller radially outermost diameter than an outer diameter of the radially outermost end of the stiffening element.

11. The device according to claim 10, wherein the damping element is directly molded onto the lower annular bearing member.

12. The device according to claim 10, wherein the lower annular bearing member and the embedded stiffening insert each comprise a plurality of circumferentially arranged through holes.

13. The device according claim 12, wherein the body and insert through holes are equally circumferentially spaced.

14. The device according to claim 10, further comprises the bearing with a first ring fixed to an upper cap, so as to form the upper annular bearing member of the suspension thrust bearing, and a second ring fixed to a lower cap, so as to form the lower annular bearing member of the suspension thrust bearing.

15. The device according to claim 14, wherein the lower cap comprises a radial flange, the stiffening insert being embedded within the radial flange.

16. The device according to claim 15, wherein the radial flange and the embedded stiffening insert each comprise at least one of the through holes.

17. The device according to claim 14, wherein the lower cap comprises an axial hub, and the stiffening insert being embedded within the axial hub.

18. The device according to claim 17, wherein the axial hub and the embedded stiffening insert each comprise at least one of the through holes.

\* \* \* \* \*